United States Patent [19]

Williams

[11] Patent Number: 5,559,883
[45] Date of Patent: Sep. 24, 1996

[54] METHOD AND APPARATUS FOR SECURE DATA PACKET BUS COMMUNICATION

[75] Inventor: Richard Williams, Leominster, Mass.

[73] Assignee: Chipcom Corporation, Southborough, Mass.

[21] Appl. No.: 109,578

[22] Filed: Aug. 19, 1993

[51] Int. Cl.⁶ ........................................... H04L 9/00
[52] U.S. Cl. .................. 380/4; 380/23; 380/25; 380/49
[58] Field of Search .................. 380/4, 23, 25, 380/49; 340/825.31

[56] References Cited

U.S. PATENT DOCUMENTS

| | | |
|---|---|---|
| 4,479,228 | 10/1984 | Crane . |
| 4,649,548 | 3/1987 | Crane . |
| 4,766,402 | 8/1988 | Crane . |
| 4,825,354 | 4/1989 | Agrawal et al. . |
| 4,853,950 | 8/1989 | Crane . |
| 4,899,333 | 2/1990 | Roediger . |
| 4,901,348 | 2/1990 | Nichols et al. . |
| 4,942,574 | 7/1990 | Zelle . |
| 4,949,340 | 8/1990 | Smith et al. . |
| 4,962,531 | 10/1990 | Sipman et al. ............................ 380/24 |
| 4,980,913 | 12/1990 | Skret ........................................ 380/23 |
| 5,012,467 | 4/1991 | Crane . |
| 5,161,192 | 11/1992 | Carter et al. . |
| 5,177,788 | 1/1993 | Schanning et al. . |
| 5,220,604 | 7/1993 | Gasser et al. ............................ 380/23 |
| 5,261,102 | 11/1993 | Hoffman ............................ 340/825.31 |
| 5,263,157 | 11/1993 | Janis ........................................ 380/25 |
| 5,263,158 | 11/1993 | Janis ........................................ 380/23 |
| 5,305,385 | 4/1994 | Schanning et al. ........................ 380/25 |

*Primary Examiner*—David C. Cain
*Attorney, Agent, or Firm*—McGlew and Tuttle, P.C.

[57] ABSTRACT

A method and system for secured data communication where a plurality of users communicate through ports on a common communication channel. The users communicate by transmitting and receiving data packets. The data packets are transmitted with a variety of fields of information, including but not limited to a destination address, a source address and a source port ID. A security module is connected to the common communication channel and reads the data packet contents and the source port ID. The security module then checks this information to see if the data packet is eligible to be transmitted on the common communication channel and to check which ports are eligible to receive the data packet. If the data packet is not eligible to be transmitted on the common communication channel, the security module destroys the data packet. The security module also sends out a security message on a security channel indicating which ports are eligible to receive the data packet. Each port reads the security message on the security channel and either passes the data packet to the respective user or blocks the data packet if the port is not one of the eligible ports.

10 Claims, 6 Drawing Sheets

METHOD AND APPARATUS FOR SECURE DATA PACKET BUS COMMUNICATION

FIELD OF THE INVENTION

The present invention relates to a method and apparatus for communicating information and in particular to secure communication over local area networks (LANs).

BACKGROUND OF THE INVENTION

Presently many LANs have users that communicate with each other over a common communication channel. Each user is physically connected to the communication channel by ports, and transmits and receives information back and forth from the communication channel through the ports.

Many LAN connection systems provide a flexible means of configuring the number of ports. This is often accomplished by partitioning groups of ports onto individual modules, which then may be installed into a communications concentrator. A common information bus built within the backplane of the concentrator allows individual modules to be interconnected to act as a single communications system.

In the "ETHERNET"™ LAN each user is given a unique address and information is transmitted in data packets over a communication channel known as a backplane bus. Each data packet has a source address indicating which user generated the data packet and each data packet also has a destination address indicating for which user the data packet is intended. Each user listens to the communication channel and when it hears its own address as the destination address of a data packet, the user knows that the data packet is intended for itself.

Disadvantages of this system are that any user connected to a port can hear and receive all the data packets that are transmitted onto the backplane bus. Also any user can physically connect to a port and transmit information or instructions over the backplane bus.

U.S. Pat. No. 4,899,333 to Roediger discloses a system with a switching distribution network. Data packets are received by the data switching modules, and these data switching modules read the destination address of the modules and decide on which one a plurality of paths to send the data packet. The data switching modules provide a small measure of security, in that data packets are not sent to paths where they do not belong. The main disadvantage of such switching systems is the cost and complexity of the switching modules.

An attempt has been made to provide a more secure LAN in U.S. Pat. No. 5,161,192 to Carter et al. This patent discloses a system in which several ports are connected to a repeater. Each repeater has its own rules for which signals can be received and then retransmitted to its ports. If a signal fails these rules for any reason, a portion of the signal is modified to make it unreadable. All the ports of one repeater either all receive the same signal or receive the modified signal. There is no differentiating between ports of the same repeater. All ports of one repeater must obey the same set of rules.

Clearly then several repeaters must be connected together in order to be able to differentiate between groups of ports. Carter therefore requires a separate repeater for each set of rules and the sub group that follows those rules. Carter then usually requires another repeater to connect the individual repeaters. Many networks do not need or can afford this many repeaters. The number of repeaters gets excessively high when each port is required to be secure and only receive data packets for itself. In Carter each port would then need its own repeater with its own set of rules.

U.S. Pat. No. 5,177,788 to Schanning et al, describes a system where several repeaters are connected to a backbone. Each of these repeaters checks the addresses of the data packets transmitted into the repeater by any of the ports of the repeater. If any of these addresses indicate that a port is not to receive the data packet, an individual and separate signal is sent to each of the ports over a discrete line. A jam pattern is also sent from the repeater to each individual port. Depending on the separate individual signal that each port receives over its own discrete line, the port decides whether or not to pass the data packet or the jam pattern to the user of the port. The disadvantage of this system is that it is limited to repeaters and each repeater must individually check each data packet coming into the computer. Also there must be a separate and individual line from the repeater to each port, directly telling each port whether or not to pass the data packet or the jam pattern. As the number of ports increases, it quickly becomes impractical to send each port an individual and separate signal.

SUMMARY AND OBJECTS OF THE INVENTION

The present invention provides a security sever module which is a shared resource for all the ports that make up the LAN within a communications concentrator. Ports of the concentrator are viewed as clients or users of the security servers. There are two major benefits of a centralized security architecture.

First is that complicated and expensive security functions need only be implemented once, regardless of the number of modules and ports which utilize the security services. This is as opposed to the architecture suggested by Carter, which requires the security functions be implemented for a limited group of ports (e.g., the ports that make up an individual module).

The second benefit is that a common communications channel can be used to convey security commands between the security server and the client ports. This is in contrast to Shanning et al, which utilizes separate and individual channels to each port to convey such information.

The present invention provides a security module connected to a common communication channel of a LAN. This security module reads information from a data packet on the common communication channel and determines if the data packet belongs on the common communication channel and which ports on the common communication channel are eligible to receive the data packet. If the data packet does not belong on the communication channel, then the security module destroys or alters the data packet to make it unintelligible. The security module also issues a security message indicating which ports are eligible to receive the data packet. Each port reads the security message and determines if it is eligible to receive the data packet. If a port is eligible to receive the data packet, the port passes the data packet to the user connected to the port. If a port is not eligible to receive the data packet, the data packet is blocked from passing to the user connected to the port.

In a preferred embodiment, the data packet contains a source address of the user who generated the data packet and the data packet also contains a destination address of the user for whom the data packet is intended. Information is also conveyed to the security module regarding which slot and port the data packet originated from. The originating slot and port are known as the source slot and source port, and each slot and port have their own slot ID and port ID respectively. The security module contains a look-up table for the source address, the destination address and the originating slot and port. Depending on the information found in the look-up tables, the security module may, or may not, destroy the data packet, and will issue a security message indicating which ports are eligible to receive the data packet. If the LAN is operating under "ETHERNET"™ guidelines, then each port that is not eligible to pass the data packet onto the associated user, replaces the contents of the packets with a jam pattern, since "ETHERNET"™ requires that data packets be passed to users regardless.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
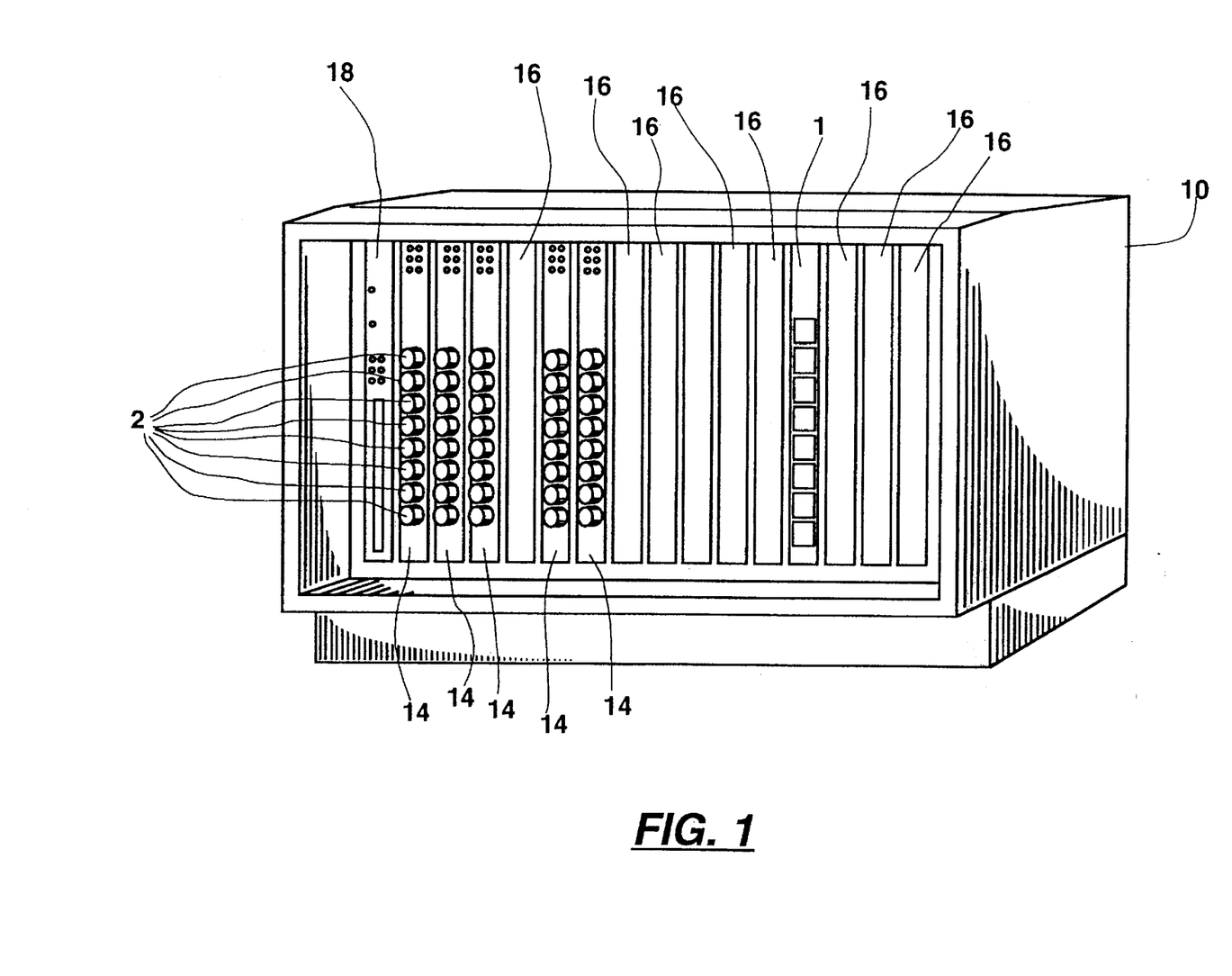
FIG. 1 shows a concentrator having slots and several modules positioned in those slots.
Figure 2:
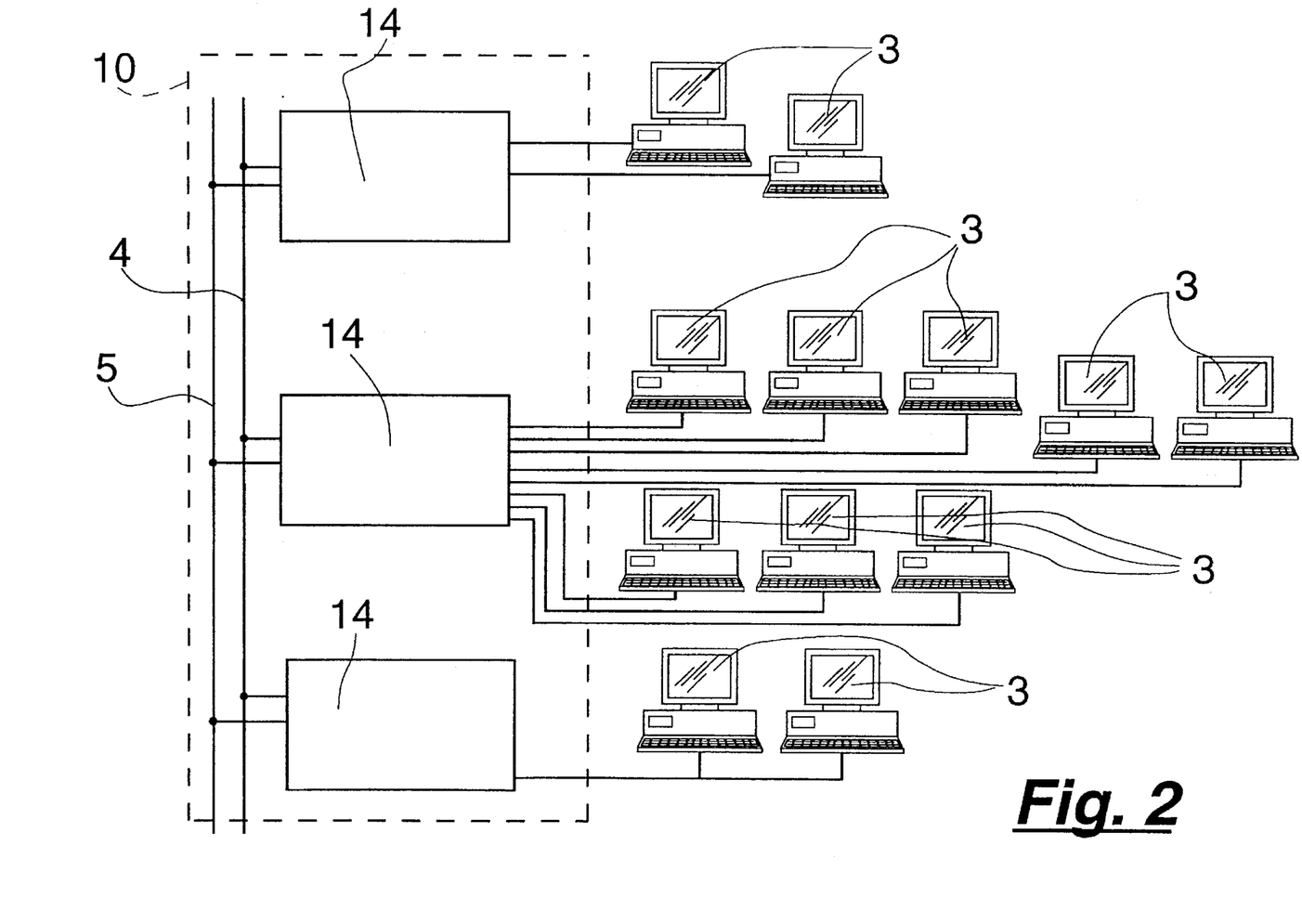
FIG. 2 is a schematic diagram of users connected to modules which are then connected to a common communication channel and a security channel.
Figure 3:
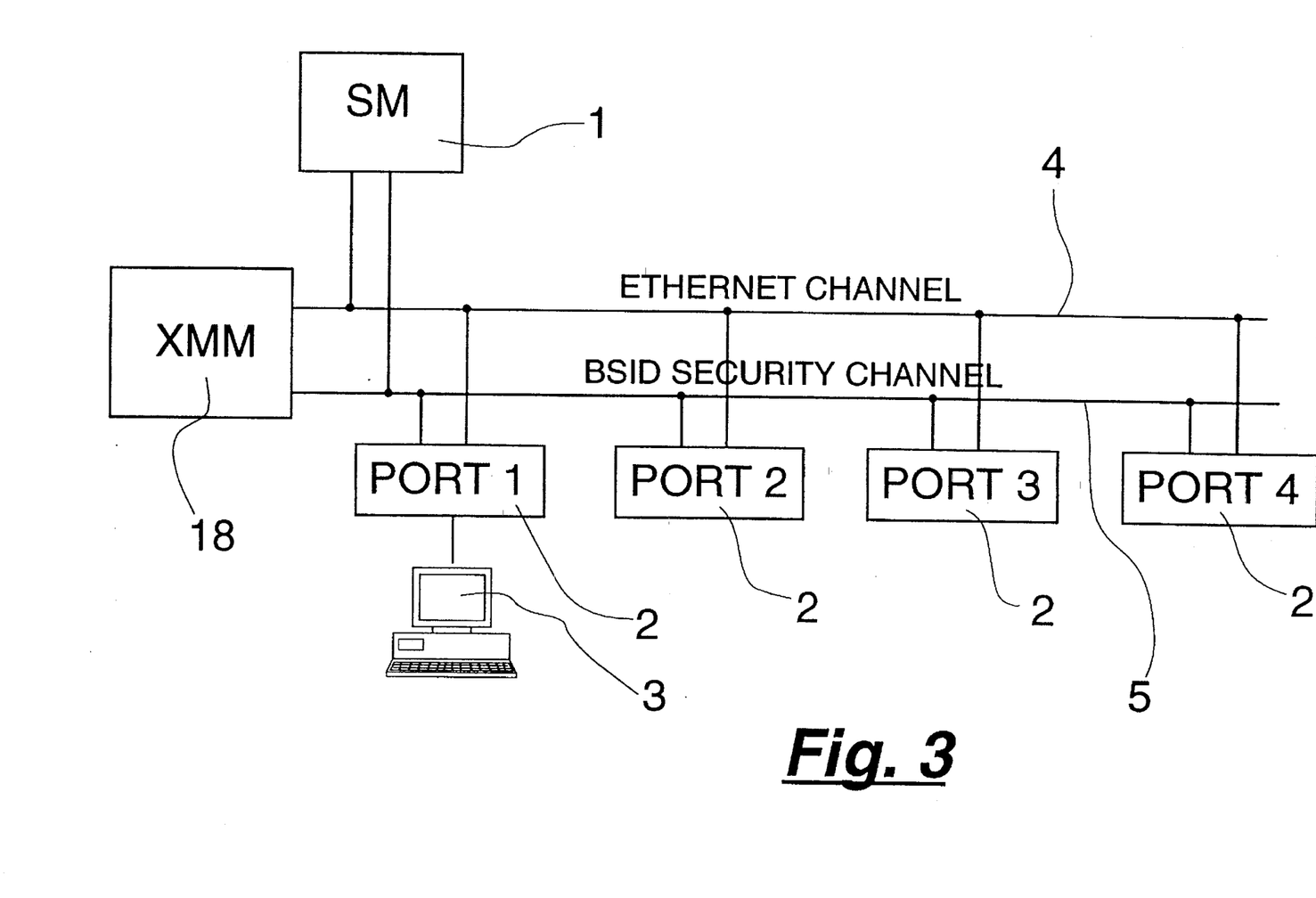
FIG. 3 is a schematic view of the security module, a management module, and ports and users connected to a common communication channel and a security channel.

Referring to the drawings and in particular to FIG. 1, in the preferred embodiment the LAN includes a concentrator 10. The concentrator 10 contains a plurality of slots 16 and into these slots 16, cards or modules, such as 1, 14, and 18, are inserted. The slots 16 shown in FIG. 1 are empty. One of the modules inserted into the concentrator 10 is a distribution module 14. This distribution module 14 has one or more ports 2 connected to it. A user 3, see FIGS. 2 and 3, is connected to the LAN through the port 2 of a distribution module 14. Several different distribution modules 14 can be inserted into a concentrator 10 to add more ports 2. The various modules are connected in the concentrator 10 to a common communication channel or backplane bus 4 and a security channel 5. Another module contained in the concentrator 10 is a management module 18 which manages the communication over the backplane bus 4.

Figure 4:
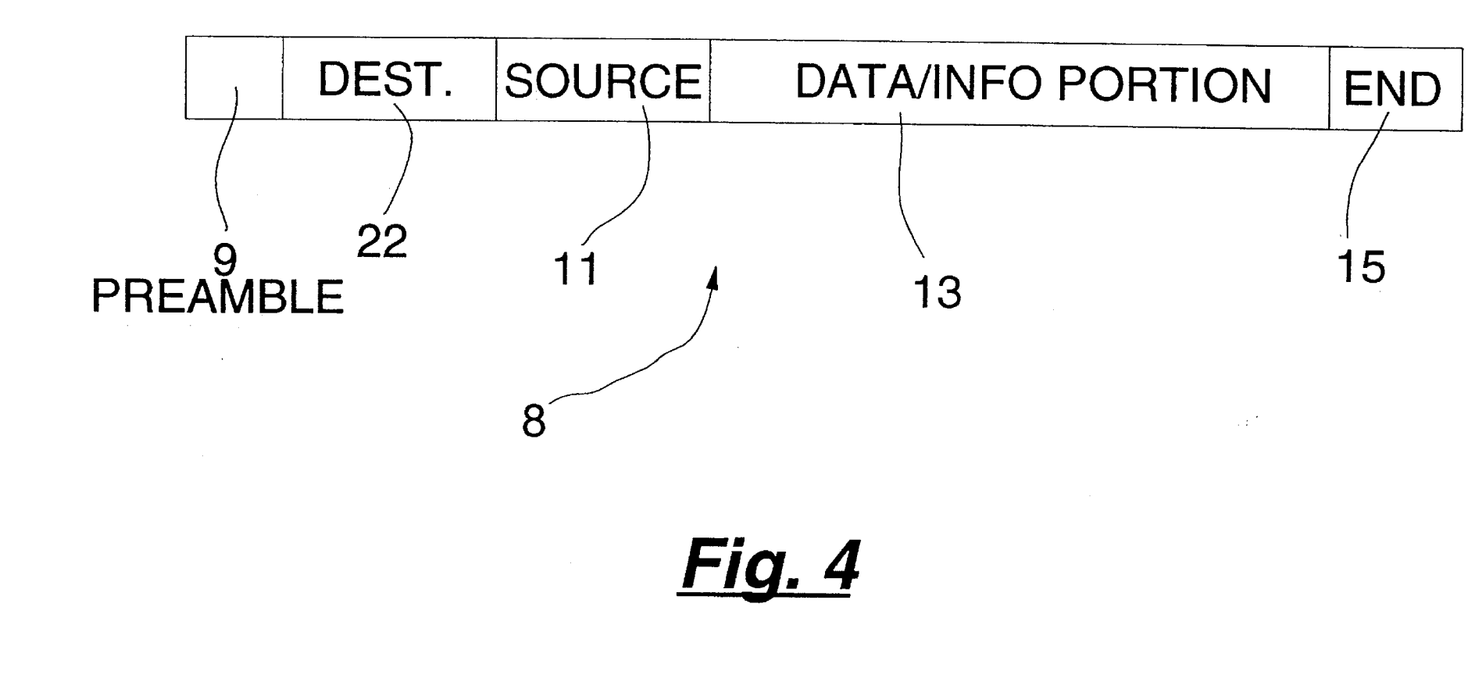
FIG. 4 is a diagram of a data packet.

As shown in FIG. 4, each of the users communicate with each other by transmitting and receiving data packets 8 over the backplane bus 4. Each data packet 8 contains a preamble 9 which indicates the start of the data packet 8, a destination address 22 which is the unique name or identification number of the user 3 who is to receive the data packet 8, a source address 11 which is the unique name or identification number of the user 3 who is generating or sending the data packet 8, a data/info portion 13 containing the actual data or information that is to be communicated and an end portion 15 indicating the end of the data packet 8. When each of the ports 2 initially transmit a data packet 8 onto the backplane bus 4, the port 2 also initially transmits the source slot/port ID of that port onto the security channel 5.

Figure 5:
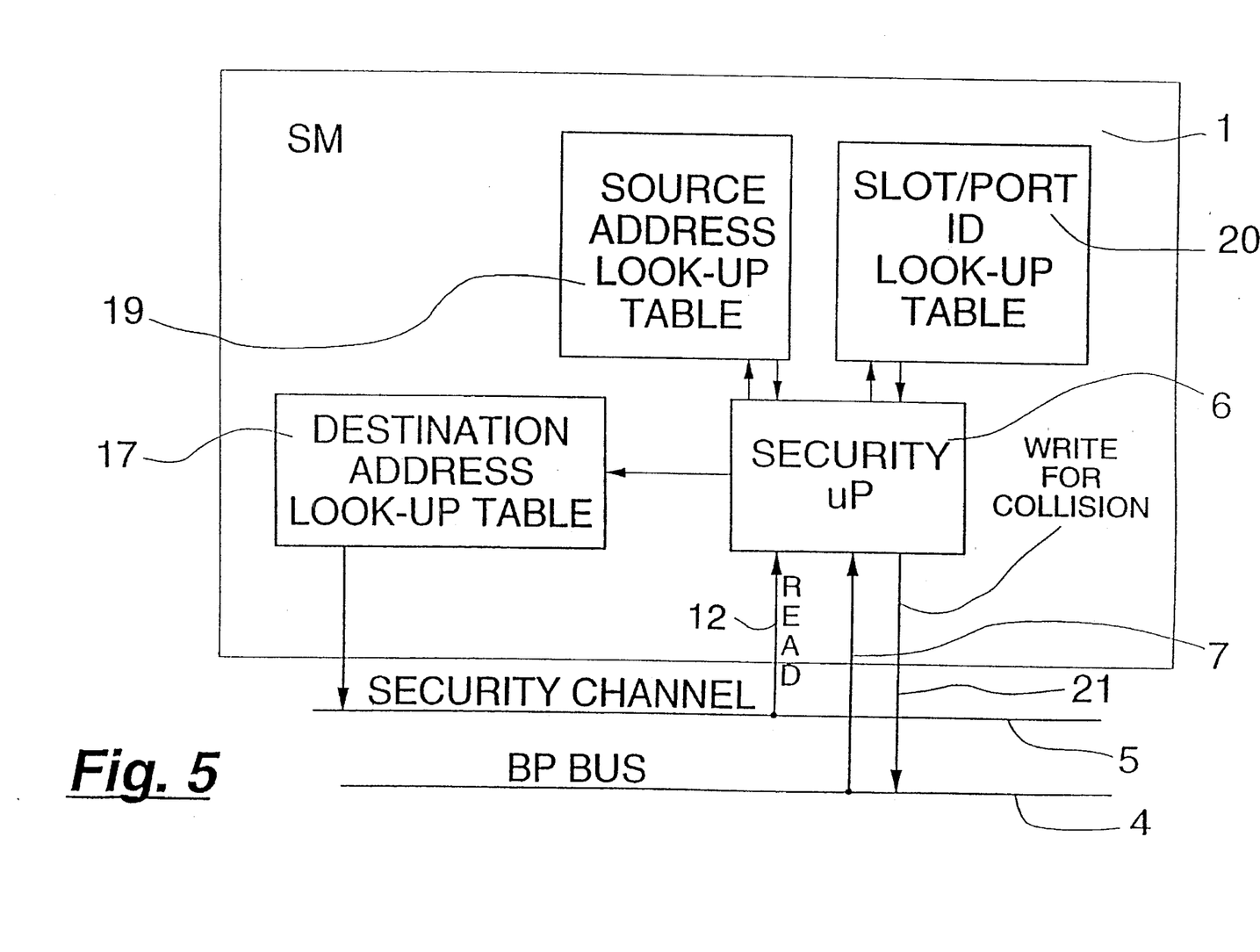
FIG. 5 is a schematic view of a security module.

A security module 1 is also contained inside the concentrator 10 and connected to the backplane bus 4 and the security channel 5. As shown in FIG. 5, the security module 1 has a security processor 6 which is connected to the backplane bus 4 by an address read connection 7. The security processor 6 reads the data packets from the backplane bus 4 and inside the security processor 6, the destination address 22 and the source address 11 are stripped off and sent to a destination address look-up table 17, and a source address look-up table 19 respectively. The security processor 6 also has a source slot/port ID connection 12 for reading the source slot/port ID from the transmitting port 2. The security processor then sends this source slot/port ID to a source slot/port look-up table 20. The source address look-up table 19 and source slot/port ID look-up table 20 send information back to the security processor 6 indicating whether or not the source address 11 and/or the slot/port ID is allowed to transmit on the backplane bus 4. If the source address 11 and/or source slot/port ID is not allowed to transmit on the backplane bus 4 then the security processor 6 writes onto the backplane bus 4 by a write connection 21. This causes a collision with the data packet 8 that is presently on the backplane bus 4 and the data packet 8 is destroyed. Of course other methods or structure could be used to destroy or otherwise invalidate the data packet 8.

Figure 6:
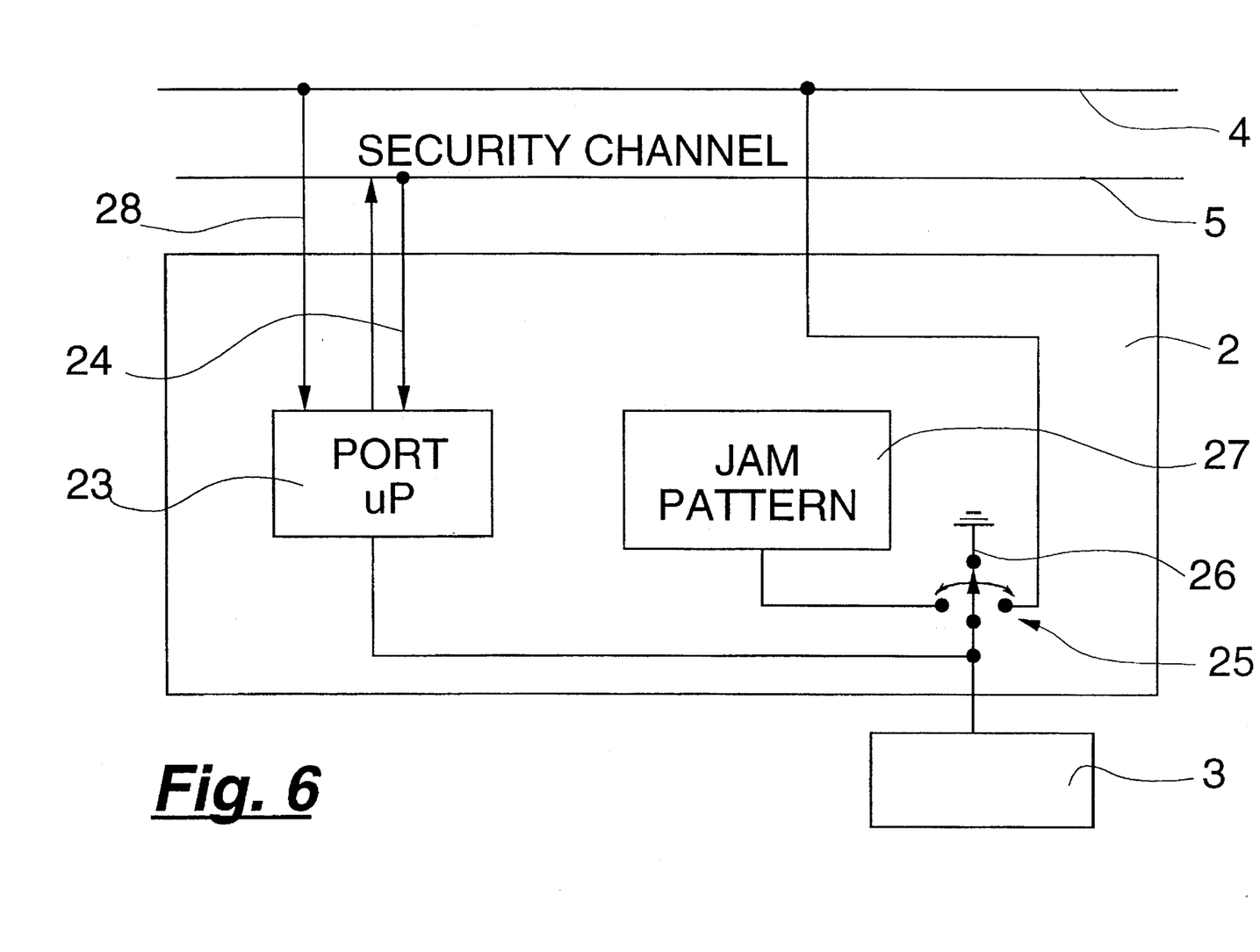
FIG. 6 is a schematic view of a port.

The destination address look-up table 17 places a security message onto the security channel 5 in accordance with the destination address 22 stripped from the data packet 8. The security message is usually the slot/port ID of the user 3 whose address or name corresponds to the destination address 22. As shown in FIG. 6, each port 2 has a port processor 23 which listens to the security channel 5 over a security connection 24. The port processor 23 also controls a switching means 25. The switching means 25 connects the user 3 to either the backplane bus 4, a ground 26 or a jam pattern means 27 which if connected to the user 3 by the switch means 25, transmits a jam pattern to the user 3. If the security channel 5 contains the slot/port ID of its own port then the port processor 23 moves the switching means 25 to connect the backplane bus 4 with the user 3. If the security channel 5 does not contain the slot/port ID, the port processor 23 connects the user 3 to either the jam pattern means 27, the ground 26 or any other device to block transmission of the data packet 8 to the user 3. Depending on the protocol used by the LAN the port processor 23 can listen to the backplane bus 4 by a connection 28 and only block or jam the data info portion 13 of the data packet 8, or block the whole data packet 8.

Very often a set of users 3 are configured to be part of a group address and all users of this set are to receive data packets having this group address as their destination address 22. The destination address look-up table 17 can be configured accordingly to have the security message send out all the slot/port Ids of this set, or the destination address look-up table 17 can send out a group code onto the security channel 5 and the port processor 23 of each port 2 of the set of ports can be configured to respond to the group code.

The preventing of users from receiving data packets 8 not addressed to them is known as eavesdropping protection.

In detail the eavesdropping operation of the security processor 6 performs the following function:

extracts the destination address from a data packet 8 determines the slot/port or group code of the destination user 3 encodes the slot/port ID or group code into a security message sends the security message serially over the security channel 5

The location or slot/port ID of a destination may be implemented by looking up the destination address in a content addressable memory (CAM) of the destination address look-up table 17. The destination can be either a unicast or multicast address. The result of this look-up can be 3 different possibilities:

1. Destination address found with associated slot and port ID
2. Destination address found with associated group code
3. Destination address unknown Note that multicast addresses, if found, can always resolve to a group code. Unicast addresses may resolve to either a slot/port ID or a group code.

The eavesdropping function uses this information from the destination address in conjunction with user settable security options to determine how each data packet 8 should be processed. There are 4 possible results:

1. The packet 8 is to be delivered to a specific port 2.
2. The packet 8 is to be delivered to a specific group which may span multiple slots/ports.
3. The packet 8 is to be delivered to all ports.
4. The packet 8 should not be delivered to any port.

ADDRESS GROUPS

Address groups are useful when a packet needs to be delivered to multiple ports simultaneously. There are two applications which will utilize the group address capability of the eavesdropping function:

1. Multicast Destination Addresses
2. Support of Redundant Ports for Fault Tolerance The eavesdropping function on a security module supports a minimum of 255 group codes. The group number is encoded using 8 bits. The code of all ONEs is reserved.

MULTICAST SUPPORT

A multicast address may be added to the destination address look-up table 17 maintained by the security module 1. The table 17 would associate a multicast address with an 8 bit group code. Ports 2 which provide connection to user 3 which utilize this multicast address would be configured to accept packets 8 with the assigned group code. This allows a multicast packet to be delivered to multiple ports 2 which have been appropriately configured.

REDUNDANT PORT SUPPORT

Two ports 2 within the same concentrator 10 may be set up as redundant links. Under these conditions, it is necessary for a source user to transmit the same packet 8 to both a primary and standby link. This is accomplished by entering the address of the user(s) which is connected via the redundant link into the address table 17 and assigning it a group code. The group code would replace the users slot/port ID within the table. The primary and standby ports are then configured to accept packets with the assigned group code.

EAVESDROPPING MESSAGE RESOLUTION

As mentioned earlier, the eavesdropping function uses the result of the destination address look up to determine how a packet should be processed. The eavesdropping function builds the appropriate security message and transmits it onto the security channel. The following table indicates the values placed in each field of the security message.

| Address Look-Up Result | Matchall | Port/Group | Slot ID | Port ID |
|---|---|---|---|---|
| Destination address 22 found with slot and port ID | 0 | 1 | Slot ID from CAM | Port ID from |
| Destination address 22 found with an associated group ID | 0 | 0 | Group ID | Unused |
| Pass to all Ports | 1 | Unused | Unused | Unused |
| Block all Ports | 0 | 1 | 11111 | 111111 |
| Destination not found | Use default message | | | |

The Matchall bit controls whether ports 2 should attempt to match their own Ids (port or group) to the ID contained in the security message. A Matchall bit with the value of 0 instructs the port that the comparison must be performed. A value of 1 instructs the port to transmit this packet 8 without interference.

The Port Group bit indicates whether the following field in the security message contains a slot/port ID or a group ID. If the port/group bit is a 1, then the following field is an eleven bit port ID. If the port/group ID bit is a 0, the following field is an eight bit group ID.

In the event that a destination address 22 is not found, a default security message may be sent.

PORT OPERATION

Ports 2 transmit onto the security channel 5 when a port becomes active on a module. The module is required to initially transmit the module's slot ID and the port ID of the active port onto the security channel 5.

All modules are required to monitor the security channel 5 for the possible eavesdropping code sent by the security module 1. As a minimum set, each port 2 is expected to react to security messages as follows:

| Security Message | Port Response |
|---|---|
| Eavesdropping function disabled | Pass packet |
| Matachall = 1 | Pass packet |
| Matchall = 0 and Matching slot and port ID | Pass packet |
| Matchall = 0 and Matching group code | Pass packet |
| No match on slot or port ID or group code | Jam packet |
| Slot ID = 11111 | Jam packet |
| No security message received and security failsafe disabled | Pass packet |
| No security message received and security failsafe enabled | Jam packet |

Note that a security module 1 may not exist on a LAN, and therefore, no security message will be transmitted onto the security channel. When eavesdropping protection is disabled, then the ports 2 shall pass a data packet 8 without interference, independent of whether a security message is received. If eavesdropping protection is enabled, and no security message is received, then the data packet 8 is blocked or replaced with a jam. A security message is considered as "not received" if a validly formed message does not appear on the security channel within 192 bit times of the beginning of data packet 8 reception.

The architecture of the security function allows that several security messages may exist for a single packet. Ports 2 must have the capability for processing multiple security messages. In order for a packet 8 to be passed without interference, resolution of all security messages must permit packet passage. That is, if any one security message indicates that a packet should be blocked, then the packet shall be blocked. This implies that after a security message which resolves to a block is received, then all subsequent security messages associated with this packet may be ignored.

If the security function/option is enabled on a port 2, and no security message is received, then this is considered an error. The port 2 is required to flag that this error occurred and report it to management module 18. The error flag is cleared once the management module 18 has been informed of the missing security message. The setting of the security failsafe option determines how a packet without a corresponding security message is to be handled.

Each port 2 of a distribution module 14 is expected to support recognition of at least two group codes. Ports 2 may implement the capability to pass packets for all 255 group codes. However, this is not a requirement.

SECURITY MODULE OPERATION

The destroying of a data packet 8 that does not belong on the backplane bus 8 is known as intrusion protection. In detail, intrusion protection performs the following functions:

extracts the source slot and port ID from the data packet 8 checks if intrusion protection is enabled for this port extracts the source address from packet 8 determines the stored slot/port of the source user from the source address look-up table 19 compares the stored slot/port from the source address look-up table 19 with the received slot/port from the security channel 5 inhibits successful transmission of the packet if the locations don't match

The stored slot/port of the source user 3 can be implemented by looking up the source address in a content addressable memory (CAM). The result of the look-up and slot/port comparison can have five different possibilities:

1. Source address found in packet and slot/port received on security channel 5 matches the slot/port stored in the CAM 2. Source address found and slot/port received on the security channel 5 does not match the slot/port stored in the CAM 3. Source address not found 4. Source address found and stored information contains a group code 5. Source address found and stored information contains a code which has been reserved to indicate a known intruder.

If intrusion protection is disabled on the port, then no look-up or comparison is performed. The packet is allowed to proceed without interference.

The following tables indicate whether the security processor 6 should inhibit the transmission of the received packet.

| CAM Look-Up Result | Action |
| --- | --- |
| Address found, slot/port ID match | Pass packet |
| Address found, no slot/port ID match | Inhibit packet* |
| Address not found | Inhibit packet |
| Address found with group code | Pass packet |
| Address found with intruder code | Inhibit packet |

*It is a user option to allow a packet to pass without interference when there is a mismatch of the slot/port ID.

For a packet to be passed without interference, the result of the address look-up and information comparison must both resolve to a Pass result. That is, if a single Inhibit result is determined, then the packet should be rendered undeliverable, regardless of the result of other look-ups or comparisons.

ADDRESS TABLE

It is the entries in the address tables which maintain the relationship between a user's address and the slot and port to which the user is connected. The address tables may also contain the mapping between a multicast address and a group code.

There are 6 ways in which entries in the address table may be changed:

1. The entire table can be cleared.
2. The table contents are automatically learned.
3. The table contents are loaded from non-volatile memory.
4. An individual entry may be manually written to the table.
5. An individual entry may be edited out of the table.
6. An individual entry is aged out of the table.

MANUAL CLEAR

The management module 18 can issue a command that causes the address table contents to be cleared. This command would most commonly be used when the management module 18 wants to load the entire contents of the table using a manual write of each entry. This command has no affect on the contents of the address table stored in non-volatile memory.

AUTOMATIC LEARNING

In this mode, the security module 1 monitors the backplane bus 4, listening for valid packets. When a valid packet is received, the security module associates the source address in the packet with the source slot/port of the packet, as indicated on the security channel 5. This association is written into the address tables. There are 4 conditions under which an address is not added to the address table:

1. If the packet is invalid.
2. If the source port is among the list of ports is among the list of ports for which the security functions have been disabled.
3. If the address table is full and no free memory exists to add another address.
4. If the address is a multicast address.

A packet is considered valid if its length is a least 64 bytes, measured after the packet's Start of Frame Delimiter, and no collision occurred during the packet's reception. During the address learning process, the eavesdropping and intruder protection functions are disabled.

LOAD FROM NON-VOLATILE MEMORY

The address table can be copied into non-volatile memory. The security module must maintain in non-volatile memory a flag which indicates whether the address table has ever been copied into non-volatile memory. Until such a copy occurs for the first time, the contents of the non-volatile address table is considered invalid. There are two conditions under which the security module initializes (or replaces) the contents of the address table with the table in non-volatile memory:

1. Due to the reception of a command from the management module 18 instructing the security module to initialize using non-volatile information.

2. After a reset is received and no management module 18 exists in the hub.

If no management module 18 exists in the hub, and the contents of the non-volatile table is invalid, then the security module 1 automatically initiates the address learning process to initialize the address table.

The current contents of the address table are automatically cleared prior to a loading of addresses stored in non-volatile memory.

MANUAL WRITE

The management module 18 can load the address table manually. This is an editing function that allows the management module 18 to write entries into the table one at a time.

MANUAL CLEAR

The management module 18 can remove individual entries in the table with this command.

AGED OUT CLEAR

Like the process that learns addresses continuously during module operation, this process continuously clears old addresses from the tables. If a valid packet has not been received by the security module for some predetermined period, then the entry in the table corresponding to the station is removed. Multicast addresses are not removed from the table by this process.

UNKNOWN ADDRESS RESOLUTION

The purpose of this option is for the management module 18 to choose the desired level of security when an address is not found in the CAM. This option affects the operation of the security module and is effective on a network wide basis.

EAVESDROPPING

A destination address is looked up in the CAM for the purposes of eavesdropping protection. If the destination address is not found then a default security message is constructed and transmitted by the security module onto the security channel 5. The management module 18 may select one of the following four default messages:

| Default Message Type | Match all | Port/ Group | Slot ID | Port ID |
|---|---|---|---|---|
| Enable Single Destination | 0 | 1 | Slot ID | Port ID |
| Enable Multiple Destination | 0 | 0 | Group ID | unused |
| Pass to all Ports | 1 | unused | unused | unused |
| Block all Ports | 0 | 1 | 11111 | 111111 |

The choice to enable one or more destinations would be used when those ports represent connections to bridges, routers, and/or backbones.

The security module powers up using the default message type of block all ports.

INTRUSION

The management module 18 is given two options. Both options are only effective when the intrusion algorithm attempts to look up a source address in the CAM and the result is that the address is not found.

The first option instructs the intrusion algorithm to treat the unknown address as unauthorized. This will result in the intrusion algorithm to inhibit transmission of this packet. A user who is very security conscience might choose this option.

The second option is to treat the address as authorized or known. This option permits the packet to be delivered to all ports without interference. A user may elect this option when the importance of connectivity outweighs the need for complete security.

ENABLE/DISABLE PORT INTRUSION PROTECTION OPTIONS

This option permits the management module 18 to disable intrusion protection at a specified slot/port number. The option to disable intrusion protection may be utilized on ports connected to bridges and "backbone" ports.

INTRUDER ID

The intrusion algorithm will record the address and slot/port number of a packet which was subjected to intrusion protection. This information will be held until the management module 18 clears it through the action of reading it.

ENABLE/DISABLE PORT EAVESDROPPING PROTECTION OPTION

This option permits the management module 18 to enable or disable eavesdropping protection. If no security module 1 has been installed and assigned to a backplane network, then eavesdropping protection must be disable for the ports 2. When eavesdropping protection is disabled, a port 2 need not receive and decode security messages. All packets received from the backplane network are transmitted to users without interference. Ports are still required to generate slot/port ID information and transmit it onto the security channel 5 even when eavesdropping protection is disabled.

ENABLE/DISABLE PORT SECURITY FAILSAFE OPTION

This option permits the management module 18 to specify how ports on the network will react if eavesdropping protection is enabled, but no security message is received.

When port security failsafe is enabled, a port will automatically block or replace a transmitted packet with a jam when no security message is received within the 64 to 192 bit time window. When port security failsafe is disabled, a port will allow a packet to be delivered unimpeded when no security message has been received.

The setting of this option is directed to each port, but is effective on a network wide basis. The default value for security failsafe protection is to be enabled.

REDUNDANT OPERATION

Primary and Standby Security Modules

It is permissible to connect more than one security module to a single backplane channel. If one or more modules have been assigned, then a single security module is elected per LAN to act as the primary server for that LAN's security functions. All other security modules on the same backplane LAN are configured as standby security modules.

All security modules connected to the same LAN must be configured with the same information. The election of the primary security server and the coordination of configuration parameters may be accomplished by, but is not limited to, the management module 18.

Selection of the primary and standby security modules is solely the responsibility of the management module 18. The module designated as primary server remains so until it either fails, or the management module 18 instructs it to become a standby. In similar fashion, a module designated as a standby cannot automatically change its operation.

The management module 18 relies on Ethernet ports to detect and report failure of the primary security module. Each Ethernet port, as part of implementing their role in the eavesdropping function, looks for the security message following the start of each packet. If eavesdropping protection is enabled on the port, and no security message is received within the expected window, then this event is detected by the port. A status flag is set at the port. It remains set until the management module 18 clears the flag in the process of reading it.

The management module 18 uses the security error detected flags at each port to determine whether the failure is at an individual port, or in the primary security module. If the management module 18 believes the primary security module is at fault, it removes the module from the LAN and designates a standby module as the new primary server. To speed up the failover process, the management module 18 should keep the standby module configured the same as the primary.

It is permitted to configure a single standby security module to act as a back-up security server for multiple primary security modules.

While specific embodiments of the invention have been shown and described in detail to illustrate the application of the principles of the invention, it will be understood that the invention may be embodied otherwise without departing from such principles.

What is claimed is:

1. A method for providing secure data communication, the method comprising the steps of:

providing a communication channel;

providing a plurality of ports on said communication channel;

providing a plurality of users, each of said users being connected to one of said plurality of ports and communicating between each other through said plurality of ports and over said communication channel;

transmitting a data packet over said communication channel from one port to another port for said communicating, the data packet being transmitted with a destination address;

providing a security module connected to said communication channel and to said plurality of ports;

said security module reading the contents of the data packet;

said security module retrieving previously stored information regarding eligibility of said plurality of ports to receive the data packet;

said security module sending an security message to said plurality of ports, said security message indicating a group of said plurality of ports eligible to receive the data packet;

each of said plurality of ports reading said security message;

said each of said plurality of ports comparing said security message with a plurality of ID codes of said respective port, and determining if said respective port is one of said eligible ports indicated by said security message;

said respective port blocking the data packet from reaching a respective connected user if said respective port is not one of said eligible ports;

said respective port passing the data packet to said respective connected user if said respective port is one of said eligible ports.

2. A method according to claim 1, wherein:

the data packet is transmitted with a source port ID;

said security module reads the data packet and said source port ID of the data packet;

said security module retrieves previously stored information regarding eligibility of said source port ID and the data packet to transmit over said communication channel;

said security module renders undeliverable the data packet if the data packet is not eligible to transmit onto said communication channel.

3. A method according to claim 1, wherein:

said transmitting of said data packets over said communication channel is performed in accordance with "ETHERNET" protocol.

4. A method according to claim 1, wherein:

said blocking of the data packet is performed by replacing a data/info portion of the data packet with a jam pattern.

5. A method for providing secure data communication, the method comprising the steps of:

providing a communication channel;

providing a plurality of ports on said communication channel;

transmitting a data packet over said communication channel from one port to another port, the data packet being transmitted with a source port ID;

providing a security module connected to said communication channel and to said plurality of ports;

said security module reading the data packet and said source port ID of the data packet;

said security module retrieving previously stored information regarding eligibility of said source port ID and the data packet to transmit over said communication channel;

said security module destroying the data packet if one of the data packet and said source port ID are not eligible to transmit onto said communication channel.

6. A method according to claim 5, further comprising:

providing a plurality of users, each of said users being connected to one of said plurality of ports and communicating between each other through said plurality of ports and over said communication channel;

said security module reading said data packet;

said security module retrieving previously stored information regarding eligibility of said plurality of ports to receive the data packet;

said security module sending an security message to said plurality of ports, said security message indicating a group of said plurality of ports eligible to receive the data packet;

each of said plurality of ports reading said security message;

said each of said plurality of ports comparing said security message with a plurality of ID codes of said respective port, and determining if said respective port is one of said eligible ports indicated by said security message;

said respective port blocking the data packet from reaching a respective connected user if said respective port is not one of said eligible ports;

said respective port passing the data packet to said respective connected user if said respective port is one of said eligible ports.

7. A method according to claim 5, further comprising:

providing a security channel connecting said security module to said plurality of ports;

each of said plurality of said ports transmitting said source port ID on said security channel during an initial portion of said each port transmitting the data packet, said security module transmitting said security message on said security channel after said each port is finished said transmitting said source port ID.

8. A method according to claim 5, wherein:

said destroying of the data packet is performed by said security processor, rendering the data packet undeliverable, by forcing a collision with said data packet.

9. A system for providing secure data communication to a plurality of users, the apparatus comprising:

a communication channel;

a plurality of users transmitting and receiving data packets over said communication channel, a data packet being transmitted with a source address, a destination address and a source port ID;

a plurality of port means connected to said plurality of users and said communication channel, said plurality of port means being for communication between the users through said plurality of port means and over said communication channel;

a security module connected to said communication channel and including security processor means for reading said source port ID and said data packet, said security processor means retrieving previously stored information regarding eligibility of said source port ID and said data packet to transmit over said communication channel, said security processor means destroying said data packet if one of said data packet and said source port ID are not eligible to transmit onto said communication channel, said security processor means also retrieving previously stored information regarding eligibility of said plurality of port means to receive said data packet, said security processor means generating an security message indicating a group of said plurality of ports eligible to receive the data packet;

security channel means connected to said security processor means and for conveying said security message from said security processor means to said plurality of port means;

port processor means contained in each of said plurality of port means and for reading said security message, comparing said security message with a port ID of a respective port, and determining if said respective port is one of said eligible ports indicated by said security message, said port processor means blocking said data packet from reaching a respective connected user if said respective port is not one of said eligible ports, said port processor means passing said data packet to said respective connected user if said respective port is one of said eligible ports.

10. A system according to claim 9, wherein:

said port means includes a switching means for switching said respective user between said communication channel and a jam pattern module.

* * * * *

UNITED STATES PATENT AND TRADEMARK OFFICE
CERTIFICATE OF CORRECTION

PATENT NO. : 5,559,883
DATED : September 24, 1996
INVENTOR(S) : Williams, et al

It is certified that error appears in the above-indentified patent and that said Letters Patent is hereby corrected as shown below:

On the title page: Item [75] should read -- Richard Williams, Leominster, MA., Brian Matthew Ramelson, Brighton, MA, Gloria Sun, Framingham, MA, Eric Edward Bomarsi, Northborough, MA, Kiwon Chang, Needham, MA, Steven E. Horowitz, Hopkinton, MA, Ian Christopher Thomas, Hopkinton, MA--.

Signed and Sealed this

Twenty-first Day of October 1997

Attest:

BRUCE LEHMAN

Attesting Officer     Commissioner of Patents and Trademarks